A. BERDAN.
Harrow.
No. 21,113.  Patented Aug 10, 1858.
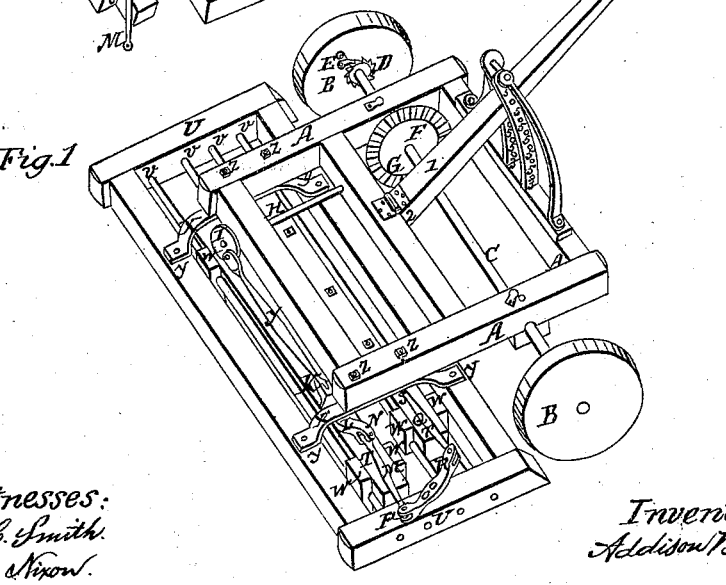
Witnesses:
D. C. Smith.
E. J. Nixon.
Inventor:
Addison Berdan

UNITED STATES PATENT OFFICE.

A. BERDAN, OF MACON TOWNSHIP, LENAWEE COUNTY, MICHIGAN.

IMPROVEMENT IN HARROWS.

Specification forming part of Letters Patent No. 21,113, dated August 10, 1858.

*To all whom it may concern:*

Be it known that I, ADDISON BERDAN, of the township of Macon, in the county of Lenawee and State of Michigan, have invented a new and useful Improvement in Harrows; and I do hereby declare that the following is a full, clear, and exact description of the construction and operation thereof, reference being had to the accompanying drawings, and to the letters of reference marked thereon, making a part of this specification, in which—

Figure 1 represents a perspective view of my machine, exhibiting its several parts, as follows: The main frame A, driving-wheels B, main shaft C, ratchet-wheel D, pawl E, bevel-wheel F, pinion G, shaft H, crank I, tongue seen at numeral 1, tongue-supporters 3, the harrow-frame U, which is attached to the main frame A by bolts Z and arched bars X, which are secured to the frame U at Y, guide V, tooth-bars T, projections W, connection J, plate L, connection M, oscillating lever O, connection Q, joint S.

Fig. 2 represents the frame U with its arched bars X, guides V, and oscillating lever O removed from the main frame A.

Fig. 3 shows one of the reciprocating tooth-bars T removed from the frame U, exhibiting clearly all of its parts.

Fig. 4 shows the other tooth-bar T turned over, exhibiting the harrow-teeth 8.

I will describe the operation of my machine, as follows: As the machine is drawn on the ground the driving-wheels B give a rotary motion to the main shaft C and bevel-wheel F, and that in turn gives a rotary motion to the pinion G, shaft H, and crank I, that in turn gives reciprocating motion to the plate L by means of the connection J and joint K, said plate being fastened to one of the tooth-bars T, and that in turn gives motion to the connection M and oscillating lever O by means of the joints N and P, which in turn give motion to the connection Q by means of the joint R, that in turn gives reciprocating motion to the other tooth-bar T by means of the joint S, (said joint S is not shown in the drawings,) and thus a reciprocating motion is produced on both tooth-bars T, said bars being free to move right and left on the guides V, which are attached to frame U, said guides passing through the holes seen in the projections W, said projections being fastened to the tooth-bars T, causing the teeth 8, which are secured to the bars T at the character &, to make a zigzag track in the ground as the machine moves along.

The tongue 1 is hinged to the main frame A at 2, and receives its support right and left by means of the supporting-pieces, (shown by the numerals 3,) said pieces being perforated with holes, as seen at the numerals 5, to allow the operator to raise and lower the harrow by placing a pin in either of the holes 5, as he chooses.

The pawl E and ratchet-wheel D are to allow the wheel B to turn loose on the shaft while the machine is in the act of turning around, all of which is seen in Fig. 1.

What I claim as my invention, and desire to secure by Letters Patent, is—

The combination of tooth-bars T, having projections W, with guide V, oscillating lever O, and frame U, the whole being constructed, arranged, and operated as herein set forth.

ADDISON BERDAN.

Witnesses:
  FRANCIS S. SNELL,
  M. SMITH.